United States Patent [19]

Balmer

[11] Patent Number: 5,343,972

[45] Date of Patent: Sep. 6, 1994

[54] BELLY MOUNT TRACTOR

[76] Inventor: Charles Balmer, Box 34, Elie, Manitoba, Canada, R0H 0H0

[21] Appl. No.: 903,221

[22] Filed: Jun. 25, 1992

[51] Int. Cl.$^5$ ............................................. B62D 61/12
[52] U.S. Cl. ..................................... 180/209; 171/143
[58] Field of Search ................ 180/209, 79, 79.3, 906, 180/149, 151; 172/297, 349

[56] References Cited

U.S. PATENT DOCUMENTS

| 2,272,603 | 2/1942 | Ellis | 180/79.3 |
|---|---|---|---|
| 3,563,329 | 2/1971 | Licari | 180/209 |
| 3,826,322 | 7/1974 | Williams | 180/209 |
| 3,972,379 | 8/1976 | Norris | 180/151 |
| 4,368,793 | 1/1983 | Igarashi | 180/209 |
| 4,446,941 | 5/1984 | Laurich-Trost | 180/149 |
| 4,693,331 | 9/1987 | Johnson et al. | |
| 5,039,129 | 8/1991 | Balmer | 180/209 |

FOREIGN PATENT DOCUMENTS 1655346  8/1971  Fed. Rep. of Germany ........ 180/79

OTHER PUBLICATIONS

1 brochure–"Geratetrager 345 GT.360 GT. 380 GT" (18 pages) (A Tractor Brochure from Fendte, a German Company).

Primary Examiner—Karin L. Tyson
Attorney, Agent, or Firm—Adrian D. Battison; Stanley G. Ade; Murray E. Thrift

[57] ABSTRACT

An agricultural tractor comprises a front frame section, a rear frame section carrying the engine and cab and a horizontal beam connecting the front frame section to the rear frame section leaving a space between the front and rear wheels and underneath the beam for receiving the implement in a belly mount position. The rear frame section includes auxiliary wheels which are simple non steering wheels movable vertically and braced against rearward movement which can be lowered by a ram to a position to lift the front wheels away from the ground to a height to move over the implement. The front wheels are steerable by a worm and wheel arrangement to a position at right angles to the normal forward direction to allow manouverability. The tractor can be used for the various operations in growing row crops with the implement attached on a three point hitch rearwardly of the front frame section. Harvesting is carried out by a root crop harvester having a lifting part attached to the three point hitch and a cleaning and discharge part attached rearwardly of the tractor frame with a conveyor passing between the two between the rear wheels.

15 Claims, 5 Drawing Sheets

BELLY MOUNT TRACTOR

FIELD OF THE INVENTION

This invention relates to an agricultural tractor arranged for transportation of an agricultural implement in a working action across the ground in which the agricultural implement is mounted rearwardly of the front wheels, forwardly of the rear wheels and underneath a longitudinal boom of the tractor, and to a root crop harvesting machine using the agricultural tractor.

During the early development of farm tractors at a time when the tractors were of relatively low power, it was common for the implement to be carried by the tractor across the ground to be mounted underneath the tractor in a belly mount position rearwardly of the front wheels and forwardly of the rear wheels. Other tractors during these early development years mounted the implement rearwardly of the tractor in a towing position.

The development of the three point hitch which comprises a pair of lower link arms on which the implement is supported and a central pivot arm at a position above the lower link arms which hold the implement against twisting about a transverse axis at the lower link arms, led further to the use of the trailing position.

The trailing position has the advantage that the implement can readily be hooked up into place either as a simple trailing unit or on the three point hitch arrangement. The belly mount position is much more inconvenient for the mounting on the tractor since it is necessary to move the implement into position underneath the tractor and then to attach the implement in some manner to the tractor. The belly mount position has therefore effectively fallen out of favour in relation to agricultural tractors although it is of course still well used in relation to smaller yard tractors where the mower is usually of a belly mount arrangement.

However the belly mount arrangement has the significant advantage that the implement is located in front of the cab so that the driver is able to watch the operation of the implement at the same time as watching the direction of movement without the necessity for twisting back and forth. It will of course be appreciated that in the trailing position the operator is obliged to watch both the forward direction to follow a required directional path and turn to watch the operation of the implement. This of course is tiring and can therefore lead to mistakes or a general reduction in accuracy of operation. This is particularly important in relation to row crop operations where it is of course much more important to ensure accuracy of movement and proper operation of the implement since the proper formation and harvesting of the rows is essential to maximize yield.

Despite the advantages of the belly mount system, the significant disadvantages in relation to the design of the tractor particularly for higher power tractors and relation to the attachment of the implement to the tractor have led the industry almost entirely away from the belly mount system so that almost exclusively a trailing system is used.

In recent years however some attention has been given to the design of a tractor specifically for a belly mount arrangement of the implement transported thereby. One example is shown in U.S. Pat. 4,693,331 (Johnson) assigned to Hiniker Company. This arrangement goes some way toward providing a suitable design for a tractor of this general type in which the implement is mounted on a support hitch rearwardly of the front wheels and underneath a longitudinal boom extending over the implement from the rear frame to the front frame carrying the front wheels. However this arrangement is not entirely satisfactory in relation to the steering arrangements and in relation to the handling of the implement and therefore little commercial success has been achieved to date.

A further arrangement is manufactured in Europe by Fendte in Germany the details of which are shown in a brochure of that company. The is a arrangement shown is a relatively compact with a relatively small space between front and rear wheels. The handling of the implement is inefficient and requires manual manipulation of the implement into position in the belly mount position. This is acceptable only for relatively light implements thus restricting the size of the equipment. The steering arrangement is unsatisfactory for proper manouverability.

SUMMARY OF THE INVENTION

It is one object of the present invention, therefore, to provide an improved design of agricultural tractor which will allow mounting of the implement in the belly mount position between the wheels.

According to a first aspect of the invention there is provided an agricultural tractor comprising a tractor frame having a rear frame section, a front frame section and an elongate boom extending from the rear frame section forwardly to the front frame section, a pair of rear drive wheels mounted on the rear frame section, an engine mounted on the rear frame section for generating a motor force for driving the rear drive wheels, a cab mounted on the rear frame section of the forward position thereon for observation by a driver in the cab in the forward direction and in an area of the ground underlying the boom, a pair of front wheels mounted on the front frame section, steering means for steering the front wheels relative to a longitudinal forward direction of the tractor, a hitch coupling mounted on the front frame section and arranged to support an agricultural implement rearwardly of the front wheels and underneath the boom, and auxiliary wheel means mounted on the tractor frame forwardly of the rear wheels and rearwardly of the implement including means for raising and lowering the auxiliary wheel means between a first position raised above a plane containing ground contact points of the front and rear wheels such that the tractor is supported on said front and rear wheels and a second position in which the auxiliary wheel means is lowered to a position below said plane such that the front wheels are raised from the ground to a height sufficient to allow the front wheels to pass over an implement on the ground.

According to a second aspect of the invention there is provided an agricultural tractor comprising a tractor frame having a rear frame section, a front frame section and an elongate boom extending from the rear frame section forwardly to the front frame section, a pair of rear drive wheels mounted on the rear frame section, an engine mounted on the rear frame section for generating a motor force for driving the rear drive wheels, a cab mounted on the rear frame section of the forward position thereon for observation by a driver in the cab in the forward direction and in an area of the ground underlying the boom, a pair of front wheels mounted on the front frame section, steering means for steering the front wheels relative to a longitudinal forward direction of the tractor, a hitch coupling mounted on the front frame section and arranged to support an agricultural implement rearwardly of the front wheels and underneath the boom, the boom is fixed relative to the rear frame and wherein the steering means is arranged to turn the front wheels to a position substantially at right angles to the boom and wherein there is provided drive means for drivingly rotating the front wheels.

It is a further object of the present invention to provide an improved root crop harvesting machine utilizing an agricultural tractor of the above general type.

According to the invention, therefore, there is provided a agricultural tractor and a root crop harvester comprising a tractor having a tractor frame having a rear frame section, a front frame section and an elongate boom extending from the rear frame section forwardly to the front frame section, a pair of rear drive wheels mounted on the rear frame section, an engine mounted on the rear frame section for generating a motor force for driving the rear drive wheels, a cab mounted on the rear frame section of the forward position thereon for observation by a driver in the cab in the forward direction and in an area of the ground underlying the boom, a pair of front wheels mounted on the front frame section, steering means for steering the front wheels relative to a longitudinal forward direction of the tractor, a hitch coupling mounted on the front frame section and arranged to support an agricultural implement rearwardly of the front wheels and underneath the boom, and a root crop harvester comprising a crop lifting section having means for lifting the crop from the ground, a conveyor and a cleaning and discharge section, said crop lifting section being mounted on said hitch coupling for transportation by said tractor in the area rearwardly of the front wheels and underneath the boom, said cleaning and discharge section being mounted on the rear frame section rearwardly thereof for transportation thereby, said conveyor extending from the crop lifting section, rearwardly under the rear frame section between the rear drive wheels to the cleaning and discharge section.

One or more embodiments of the invention will now be described in conjunction with the accompanying drawings.

BRIEF DESCRIPTION OF THE DRAWINGS

In the drawings like characters of reference indicate corresponding parts in the different figures.

DETAILED DESCRIPTION

The tractor shown in the drawings is generally indicated at 10 and includes a rear frame section 11 a front frame section 12 and an elongate interconnecting boom 13.

The rear frame section 11 includes a cab 14 with a seat 15 in which the driver can locate facing forwardly over the boom 13 and beyond the front frame section 12. The cab is mounted on transverse support beams 16 and 17 forming part of the frame. Rearwardly from the transverse beam 16 and 17 extend frame plates 18 which are spaced by the width of a motor 19 mounted upon and supported by the frame plates 18. The transverse support plates 18 extend forwardly beyond the cross beam 16 and 17 to a front plate 19 to which is attached the boom 13 in the form of a single elongate beam welded to the front vertical plate 19 at right angles thereto so as to extend horizontally therefrom forwardly and centrally of the rear frame section. Suitable supporting gussets are provided to hold the beam 13 in fixed position relative to the rear frame section and particularly the transverse plate 19. The boom 13 comprises a box beam.

Figure 2:
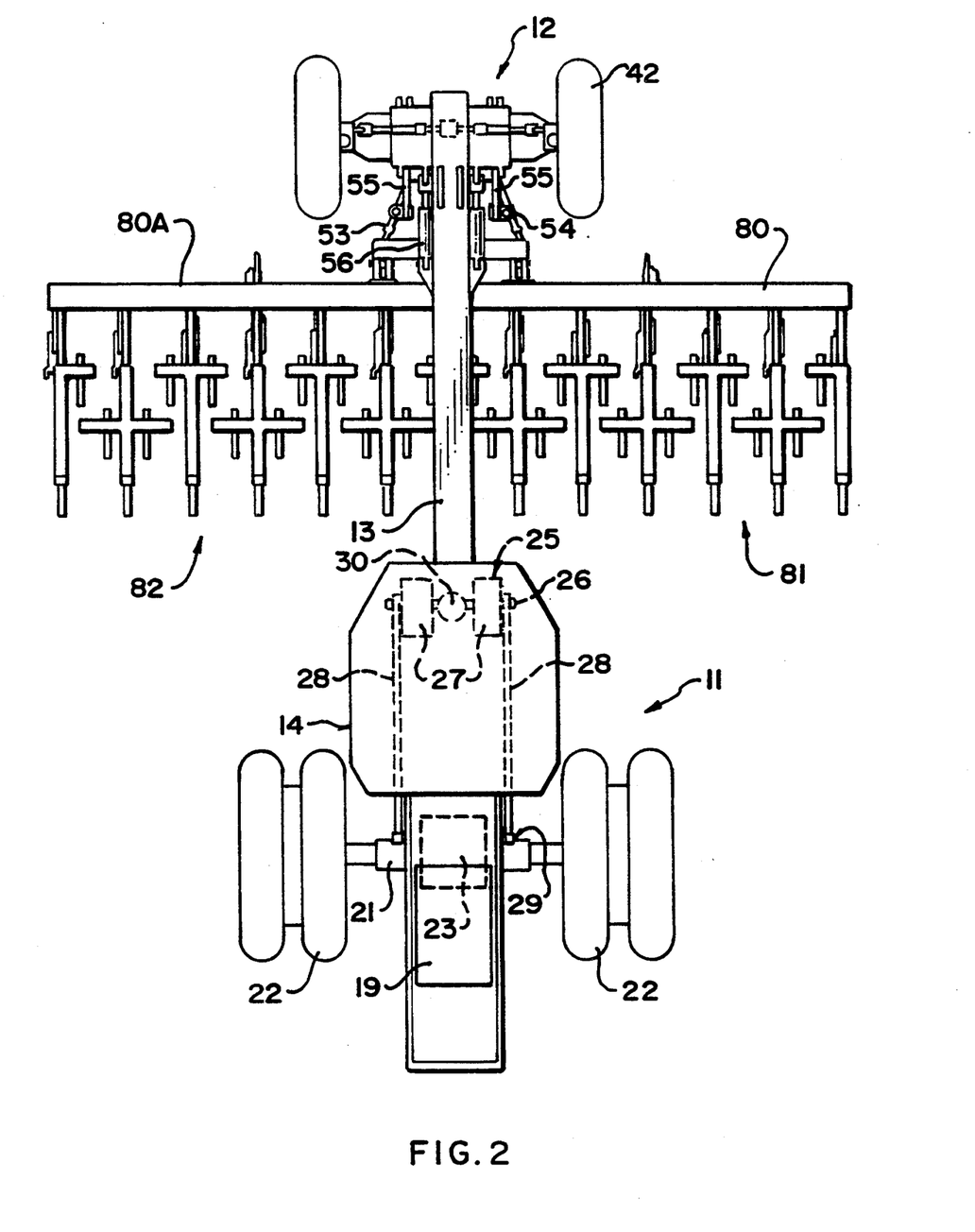
FIG. 2 is a top plan view of the tractor of FIG. 1 with the root crop harvesting replaced by a planting system shown schematically on one side and a cultivator system on the other side to show the different types of equipment which can be used.

Mounted on the rear frame section at the plates 18 is provided a horizontal axle 21 best visible in FIG. 2. Upon the axle is mounted ground wheels 22 for rotation about a common horizontal axis. The ground wheels can be driven either by a transmission system 23 by a mechanical drive linkage arrangement or by hydraulic motors mounted at the axle of each of the wheels 22 and powered by a hydraulic pump driven by the motor 19.

Design details of the transmission system will be readily available to one skilled in the art from for example a four wheel drive tractor of the type manufactured by Steiger, John Deere or Fiat (Versatile) . In one example the whole of the front frame section of a four wheel drive articulated type tractor can be used for the rear frame section of the present tractor, simply reversing the frame arrangements. In such an arrangement the articulated linkage is removed and is replaced by the fixed boom 13 which is attached in place of the articulation linkage. In such an arrangement the axle 21 can pivot in known manner about a vertical axis through a shallow angle of the order of 5° . This offset positioning of the rear wheels 22 operates in conjunction with a steering described hereinafter to provide proper direction and tracking of the tractor in movement across the ground.

At a forward part of the rear frame section is provided an auxiliary wheel arrangement generally indicated at 25. This comprises a transverse axle 26 on which is mounted a pair of wheels 27 of the general type used on fork lift trucks having a solid rubber tire and a diameter of the order of one foot. The two wheels are spaced along the axle 26 with the axle being arranged in horizontal position transversely of the longitudinal direction of the tractor. At each end of the axle is mounted a brace 28 which extends from the axle rearwardly to a pivot pin 29 mounted on a suitable location of the rear frame section for example at the transmission 23. The braces 28 thus act to locate the axle 26 in the fixed horizontal position against any steering movement. The braces 28 are pivotal about the pivot pin 29 at the inner end and about the axle 26 so as to allow movement of the axle in a generally vertical direction relative to the rear frame, the movement being slightly arcuate in view of the pivotal movement of the braces 28. The vertical movement of the axle is actuated by a hydraulic ram 30 located between the wheels 27 and extending from the axle to a mounting bracket 31 underneath the frame and between the plates 18.

Figure 3:
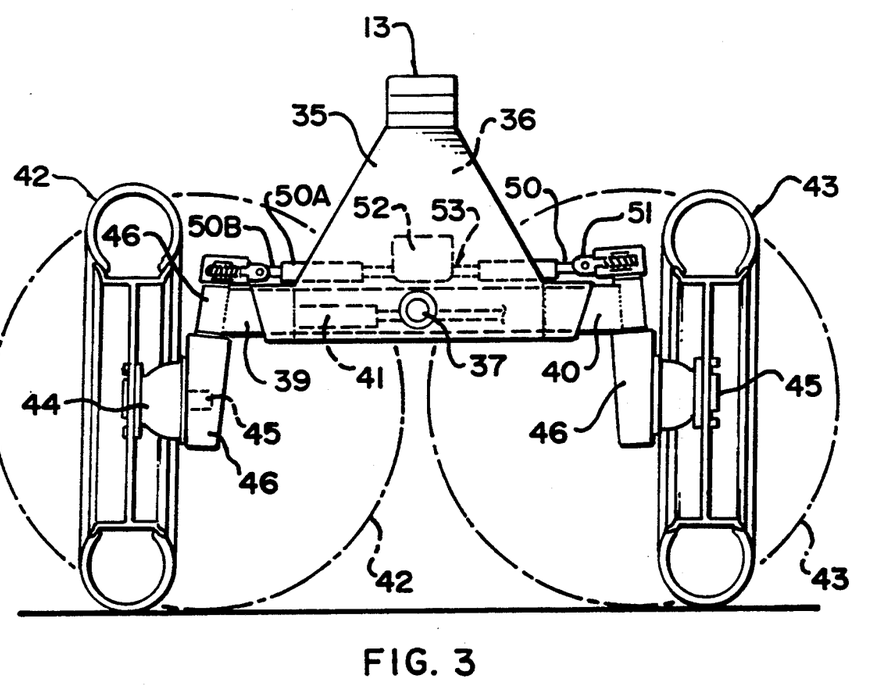
FIG. 3 is a front elevational view of the front frame section of the tractor of FIG. 1 showing the steering arrangement.
Figure 3A:
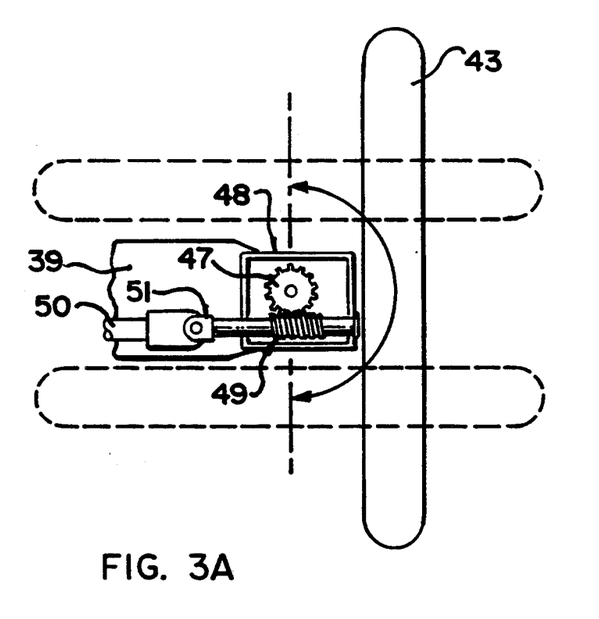
FIG. 3A is a top plan view of one part of the front section of the tractor.
Figure 4:
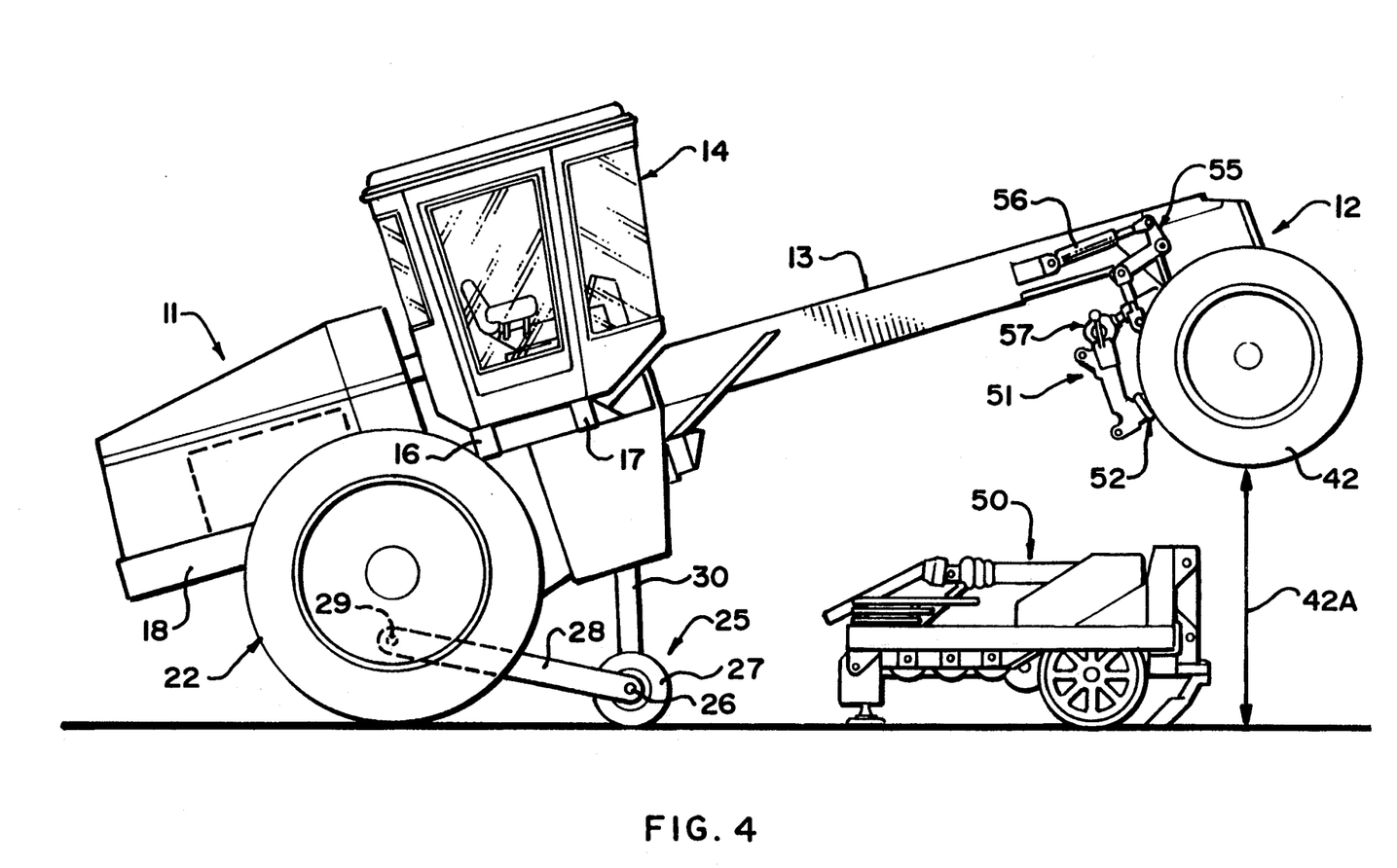
FIG. 4 is a side elevational view of the tractor with the implement removed showing the position of the tractor for engagement of the implement.

Turning now to FIGS. 3 and 4, the front frame section is shown in more detail and comprises a pair of parallel transverse plates 35 and 36 welded to the box beam 13 extending vertically downwardly therefrom. Each of the plates is substantially triangular in shape so as to extend downwardly and outwardly from the beam to a wider position beneath the beam. The plates carry a horizontal pivot pin 37 with the axis of the pivot pin extending longitudinally of the beam 13. Across the pivot pin is mounted a horizontal axle 38 in the form of an elongate channel member with the channel facing downwardly and attached to the pin on the underside of the pin so that the channel member is supported by the pin and allowed to pivot about the axis of the pin to accomodate changes in ground orientation.

Within the channel is mounted a pair of beams 39 and 40 each of which is slidable longitudinally of the channel and each of which projects outwardly from a respective end of the channel. The longitudinal sliding movement allows adjustment of the distance between the wheels by increasing and decreasing the axle width under control of a hydraulic cylinder 41.

On the axle is mounted a pair of wheels 42 and 43 defining the front wheels of the tractor. Each of the wheels is driven by a hydraulic motor arrangement 44 receiving hydraulic fluid under pressure through conduits (not shown) from a hydraulic pump driven by the motor 19.

Each wheel is rotatable about a horizontal axle pin 45 which carries suitable bearings on which the wheel is mounted for rotation. The axle pin is carried upon a vertical steering pin 46 which is rigidly attached to the axle pin and extends upwardly therefrom to bearings carried on the beam 39, 40. At the top of the steering pin 46 is mounted a worm gear 47 mounted within a housing 48 carried on the top of the beam 39, 40. The worm gear 47 can thus rotate about the axis of the steering pin 46 commonly with the steering pin about the bearings on the beams 39, 40. Within the housing 48 is carried a worm 49 with an axis of rotation longitudinal of the axle and at right angles to the axis of the steering pin 46. The worm lies alongside the radially outwardly projecting teeth on the worm gear wheel 47 so as to cooperate therewith in a conventional worm and wheel action to cause rotation of the worm gear 47 about its axis in response to rotation of the worm 49 about its axis while the worm 49 is held fixed against axial movement by the housing 48.

Each of the worms 49 is attached to a respective shaft 50 by a pivot coupling 51 so that the shaft 50 extends from the respective worm 49 to a central drive motor 52 mounted on the front plate 36. The drive motor 52 comprises a hydraulic motor rotatable in forward and reverse directions and having a drive coupling at each end connected to a respective one of the shafts 50. The drive coupling is indicated at 53 also allows some pivotal action similar to the pivot coupling 51 so that misalignment between the axis of the worm 49 and the axis of the drive motor 52 is accomodated by the pivotal action through the couplings 51 and 53.

Changes in length between the worm 49 and the drive motor 52 are accomodated by a sliding action between two portions of the shaft 50. Thus the shaft 50 is formed in two parts 50A and 50B each of which is square in cross section with the part 50A acting as a sleeve receiving the part 50B therein. Automatically, therefore, the shaft 50 take up changes in length which may be due to the pivotal action of the axle about the pin 37 or due to changes in length of the axle by adjustment of the wheel spacing as described hereinbefore.

The axle pin 45 is arranged to offset the wheel from the axis of the steering pin 46 to a sufficient distance that the wheel can 180° about the axis of the steering pin 46. Thus the wheel can rotate from the first position parallel to and alongside the axle on a rear side of the axle shown in dotted line through the normal forward position of the wheel shown in full line in FIG. 3 to a position 180° spaced from the initial position lying along the axle on the front side thereof.

The driving action of the hydraulic motor 52 is effected under control of the driver in a steering operation from a suitable control for example a steering wheel, within the cab. The motor rotates and commonly drives the worm gears 49 so that the wheels necessarily steer to the required position while remaining parallel to each other.

The steering action which allows the wheels to come to a position at right angles to the direction of normal forward movement allows the vehicle to manouver very simply by direct rotation about a vertical axis through the rear axle. This allows the tractor to turn directly around at an end of the field to reverse direction for further passage across the field in the opposed direction.

For use with row crops it is essential that the front and rear wheels properly track in the same line across the field without any offset or crabbing action despite changes in incline from one site to the other as terrain varies. Any tendency of the tractor to crab is overcome by the steering action of the rear wheel to offset the rear wheel slightly thus overcoming any tendency to slip sideways due to an incline of the terrain.

Turning now to FIG. 4, a raised position of the tractor is shown in which the hydraulic ram 30 is extended to a position in which the auxiliary wheels 27 are arranged below the plane containing the ground contact points of the front and rear wheels 22 and 42. The movement is sufficient to cause the front wheels 42 to be raised from the ground by a distance 42A greater than the height of a conventional implement schematically indicated at 50. In attachment therefore of the implement to the tractor, the auxiliary wheel assembly is moved downwardly from the initial retracted position to an extended position as shown in FIG. 4 which raises the front wheels 42 upwardly away from the ground. Due to the counterbalancing effect of the motor at the rear of the tractor, the weight of the front frame assembly and the boom is relatively small in comparison with the weight of the rear frame assembly allowing a simple ram action from the hydraulic ram 30 to cause the lifting of the front wheels of the tractor. In this raised position the tractor can move forwardly across the ground in a straight line without any steering action from the auxiliary wheel assembly from a position in which the front wheels are rearward of the implement 50 to a position in which the front wheels are forward of the implement 50 allowing the ram 30 to be withdrawn and the front wheels lowered into engagement with the ground for attachment of the implement to the hitch generally indicated at 51.

The hitch 51 comprises a conventional three point hitch including a pair of lower link arms 52 and 53 each of which is pivotally connected to a coupling 54 at the base of the front frame section that is at the bottom of the rear plate 35 at a position below the axle 38. Each of the link arms is connected to a lifting strut 55 which is lifted by a hydraulic actuating ram system 56 for lifting the link arms in pivotal movement about the common horizontal axis defined by the couplings 54. The three point hitch further includes a central upper support arm 57 pivoted on a coupling at a position just underneath the beam 13 at the rear plate 35. The central support arm 57 is not hydraulically actuated but is simply a floating arm of an adjustable but otherwise constant length which is connected to the implement at a position above the coupling to the lower link arms 52 to prevent the implement from twisting about the lower link arms. The height of the implement from the ground is adjusted by actuating the ram 56. The orientation of the implement can be adjusted by increasing or decreasing the length of the upper support arm 57 generally by a turn buckle arrangement.

Figure 1:
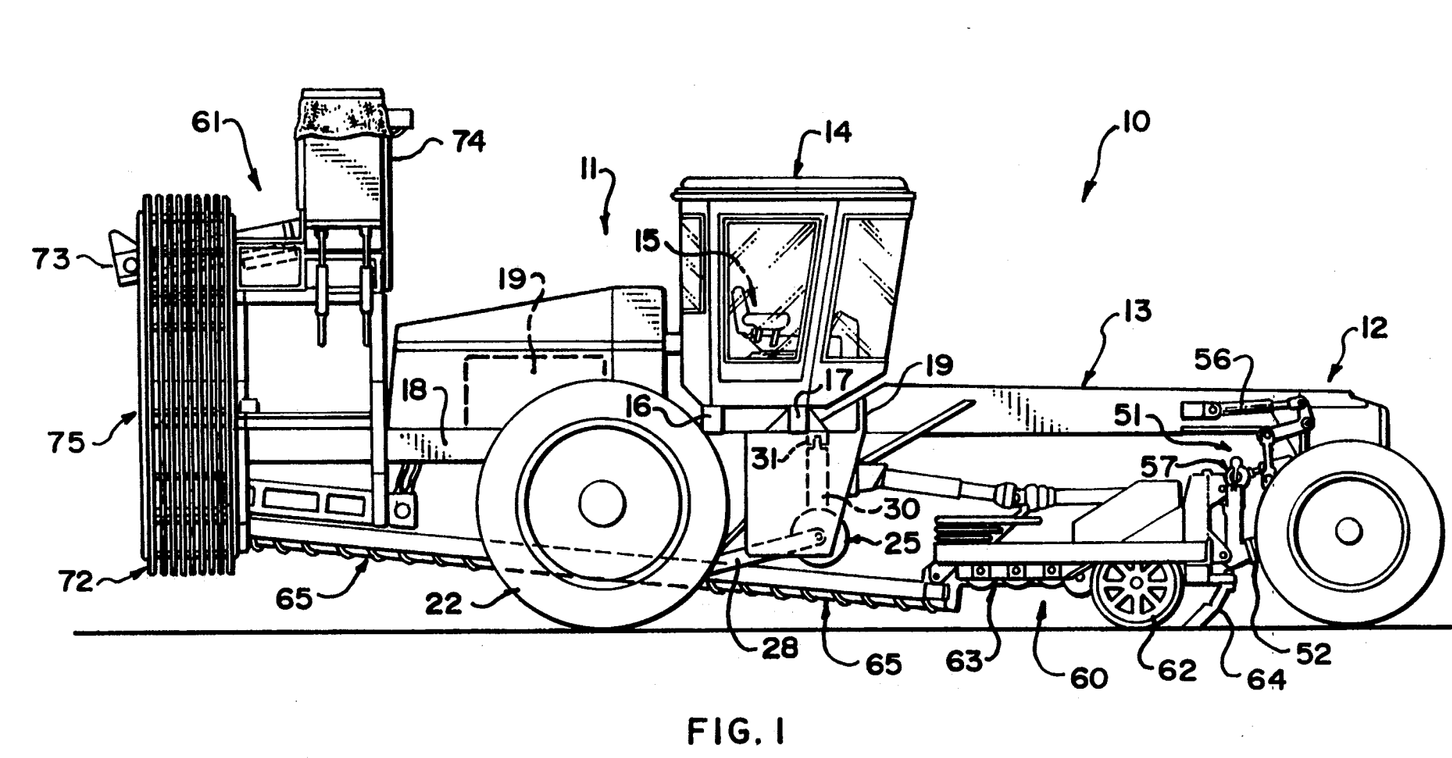
FIG. 1 is a side elevational view of a tractor of the present invention on which is mounted a root crop harvesting system.
Figure 5:
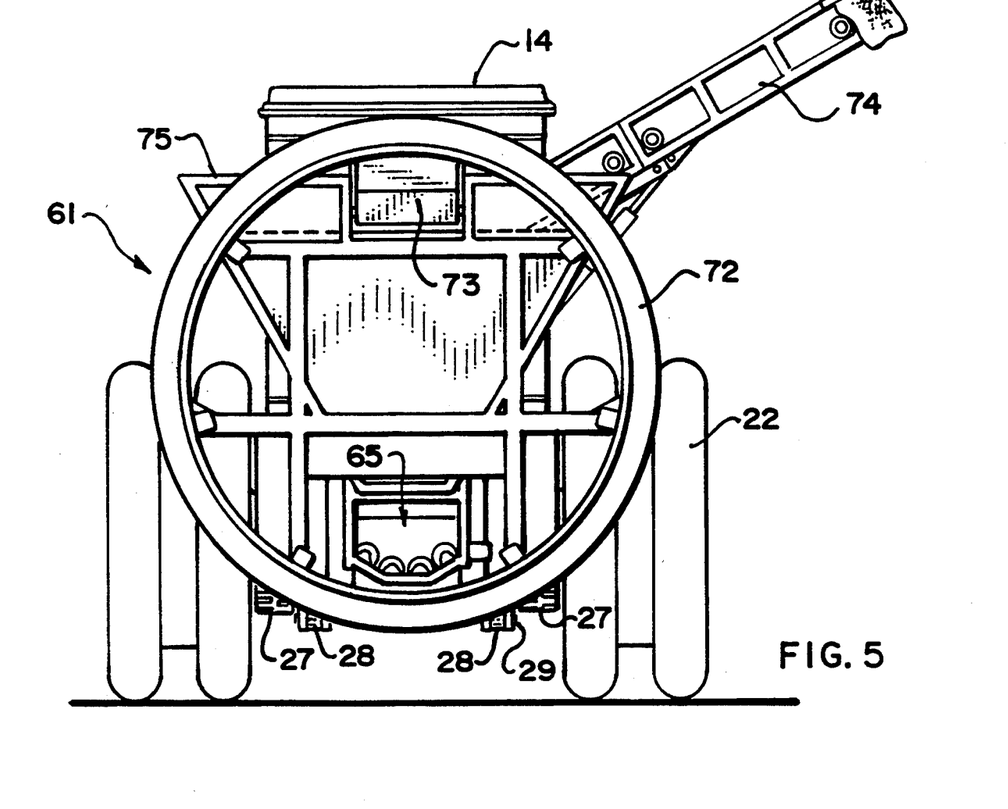
FIG. 5 is a rear elevational view of the tractor of FIG. 1.

Turning now to FIGS. 1 and 5, the parts of a conventional root crop harvester have been divided into two elements including a first lifting section 60 and a second cleaning and discharge section 61. In this arrangement the lifting section 60 is mounted on the hitch assembly 51 so as to be supported by the front frame section and carried in the belly mount position. The lifting section includes a main lifting roller 62 which operates rearwardly of a knife 64 and lifts the crop from the ground over the lifting roller onto a plurality of transportation rollers 63 with each of the rollers having a respective axis transverse to the direction of movement so that the crop is carried over the rollers rearwardly onto a conveyor system generally indicated at 65.

Figure 5A:
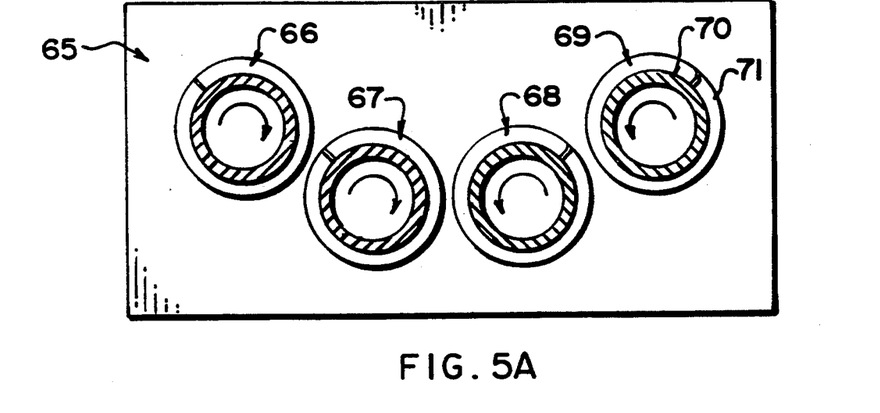
FIG. 5A is a rear elevational view of one detail of the tractor of FIG. 5.

The conveyor is shown in cross section in FIG. 5A and comprises four helical flight members 66, 67, 68 and 69. Each of the helical flight members comprises a pipe 70 on the outside of which is mounted a shallow helical flight 71 so that rotation of the pipe about a longitudinal axis causes the helical flight to apply a longitudinal force to the root crop deposited onto the conveyor from the rear of the rollers 63. The conveyor elements are arranged such that the two outer conveyor elements are raised above the two inner conveyor elements to form a channel shape within which the crop is transported. The direction of rotation of the helical flight members is such that the outer ones move inwardly toward a centre position thus tending to move the crop toward the centre position while it is transported longitudinally. This type of conveyor causes a conveying action without damaging the crop but at the same time allows the crop to move on the conveyor and to be abraded by the helical flights thus tending to clean the crop as it is moved rearwardly along the conveyor.

The cleaning and discharge section 61 includes a conventional cleaning drum 72 which rotates about a vertical axis, the drum being formed from a grid so that the crop is tumbled within the drum as it is rotated about the axis of the drum and is lifted by the drum up to a crop conveyor 73 and discharge system 74, 75. The crop can thus be stored temporarily in the discharge system 74 and then dumped by the chute portion 75 into a transportation wagon.

The tractor of the present invention, therefore, can be used for the various different operations of a root crop growing system. As illustrated schematically in FIG. 2, a cultivator section can be mounted on the tractor upon a tool bar 80 for a cultivating action. The cultivator system is indicated schematically at 81 on the right hand side of the tractor in FIG. 2. Schematically for convenience of illustration a planting system 82 of conventional nature is mounted upon a tool bar 80A. It will of course be appreciated that these implements are intended to be used simultaneously but the illustration is intended to show that the various different parts of the system can be attached to the tractor at the various different times. After the seeding and cultivation process is complete, the tractor can be used for spraying transporting a spray boom in the belly mount position. Finally the crop harvesting system is shown in FIG. 1 mounted upon the same tractor.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. An agricultural tractor comprising a tractor frame having a rear frame section, a front frame section and an elongate boom extending from the rear frame section forwardly to the front frame section, a pair of rear drive wheels mounted on the rear frame section, an engine mounted on the rear frame section for generating a motive force for driving the rear drive wheels, a cab mounted on the rear frame section at a forward position thereon for observation by a driver in the cab in the forward direction and in an area of the ground underlying the boom, a pair of front wheels mounted on the front frame section, steering means for steering the front wheels relative to a longitudinal forward direction of the tractor, a hitch coupling mounted on the front frame section and arranged to support an agricultural implement rearwardly of the front wheels and underneath the boom, and auxiliary wheel means mounted on the tractor frame forwardly of the rear wheels and rearwardly of the implement including means for raising and lowering the auxiliary wheel means between a first position raised above a plane containing ground contact points of the front and rear wheels such that the tractor is supported on said front and rear wheels and a second position in which the auxiliary wheel means is lowered to a position below said plane such that the front wheels are raised from the ground to a height sufficient to allow the front wheels to pass over an implement on the ground as the tractor is moved forwardly across the ground.

2. The tractor according to claim 1 wherein the auxiliary wheel means is mounted on the rear frame section at a forward end thereof and includes hydraulic ram means for moving the auxiliary wheel means vertically.

3. The tractor according to claim 1 wherein the auxiliary wheel means is arranged for rotation about a horizontal axis transverse to the boom and wherein there is provided means mounting the auxiliary wheel means such that the horizontal axis is fixed against steering movement.

4. The tractor according to claim 1 including brace means extending from the auxiliary wheel means rearwardly to the rear frame section.

5. The tractor according to claim 1 wherein the hitch coupling comprises a three point hitch having a pair of transversely spaced, rearwardly extending lower link arms, means mounting the lower link arms on the front frame section for pivotal movement about a common horizontal axis, hydraulic cylinder means for raising and lowering the link arms and a central support arm pivotally mounted on the front frame section between the lower link arm at a position above the common horizontal axis.

6. The tractor according to claim 1 wherein the boom is fixed relative to the rear frame, wherein the steering means is arranged to turn the front wheels to a position substantially at right angles to the boom and wherein there is provided drive means for drivingly rotating the front wheels.

7. The tractor according to claim 6 including means for adjusting the spacing between the front wheels.

8. The tractor according to claim 6 wherein the steering means includes a generally horizontal axle extending at right angles to the boom, each wheel having a horizontal axle pin around which the wheel rotates, the axle pin being mounted on a generally upstanding steering pin mounted on the horizontal axle for steering rotational movement about an axis generally longitudinal of the steering pin, the axle pin and the steering pin arranged such that the wheel can rotate about the steering axis to a position lying alongside the axle generally parallel thereto.

9. The tractor according to claim 8 wherein each wheel includes a worm gear mounted on the steering pin thereof for common rotation with the steering pin in a steering action and a worm rotatable about an axis generally longitudinal of the axle for driving rotation of said worm gear in said steering action, both the worm being driven from a common drive motor.

10. The tractor according to claim 9 including drive shaft means extending from the common drive motor to each of the worm gears, the drive shaft means including a first portion slidable longitudinally within a second portion and arranged such that rotation of the first portion is communicated to rotation of the second portion and such that adjustment of the spacing between the wheels is automatically taken up by sliding movement between the first and second portions.

11. An agricultural tractor comprising a tractor frame having a rear frame section, a front frame section and an elongate boom extending from the rear frame section forwardly to the front frame section, a pair of rear drive wheels mounted on the rear frame section, an engine mounted on the rear frame section for generating a motive force for driving the rear drive wheels, a cab mounted on the rear frame section at a forward position thereon for observation by a driver in the cab in the forward direction and in an area of the ground underlying the boom, a pair of front wheels mounted on the front frame section, steering means for steering the front wheels relative to a longitudinal forward direction of the tractor, a hitch coupling mounted on the front frame section and arranged to support an agricultural implement rearwardly of the front wheels and underneath the boom, wherein there is provided means maintaining the boom substantially fixed relative to the rear frame, wherein the steering means is arranged to turn the front wheels to a position substantially at right angles to the boom and wherein there is provided drive means for drivingly rotating the front wheels.

12. The tractor according to claim 11 including means for adjusting the spacing between the front wheels.

13. The tractor according to claim 11 wherein the steering means includes a generally horizontal axle extending at right angles to the boom, each wheel having a horizontal axle pin around which the wheel rotates, the axle pin being mounted on a generally upstanding steering pin mounted on the axle for steering rotational movement about an axis generally longitudinal of the steering pin, the axle pin and the steering pin arranged such that the wheel can rotate about the steering axis to a position lying alongside the axle generally parallel thereto.

14. The tractor according to claim 13 wherein each wheel includes a worm gear mounted on the steering pin thereof for common rotation with the steering pin in a steering action and a worm rotatable about an axis generally longitudinal of the axle for driving rotation of said worm gear in said steering action, with the worms being driven from a common drive motor.

15. The tractor according to claim 14 including drive shaft means extending from the common drive motor to each of the worms, the drive shaft means including a first portion slidable longitudinally within a second portion and arranged such that rotation of the first portion is communicated to rotation of the second portion and such that adjustment of the spacing between the wheels is automatically taken up by sliding movement between the first and second portions.

* * * * *